Dec. 5, 1961 R. KLAHN 3,012,240

DIGITAL-TO-ANALOG CONVERTER

Filed Oct. 28, 1958

INVENTOR
R. KLAHN
BY R. O. Nimtz
ATTORNEY

United States Patent Office 3,012,240

Patented Dec. 5, 1961

3,012,240
DIGITAL-TO-ANALOG CONVERTER

Richard Klahn, Morris Plains, N.J., assignor to Bell Telephone Laboratories, Incorporated, New York, N.Y., a corporation of New York Filed Oct. 28, 1958, Ser. No. 770,227
14 Claims. (Cl. 340—347)

Figures 1, 2, 3, 4:
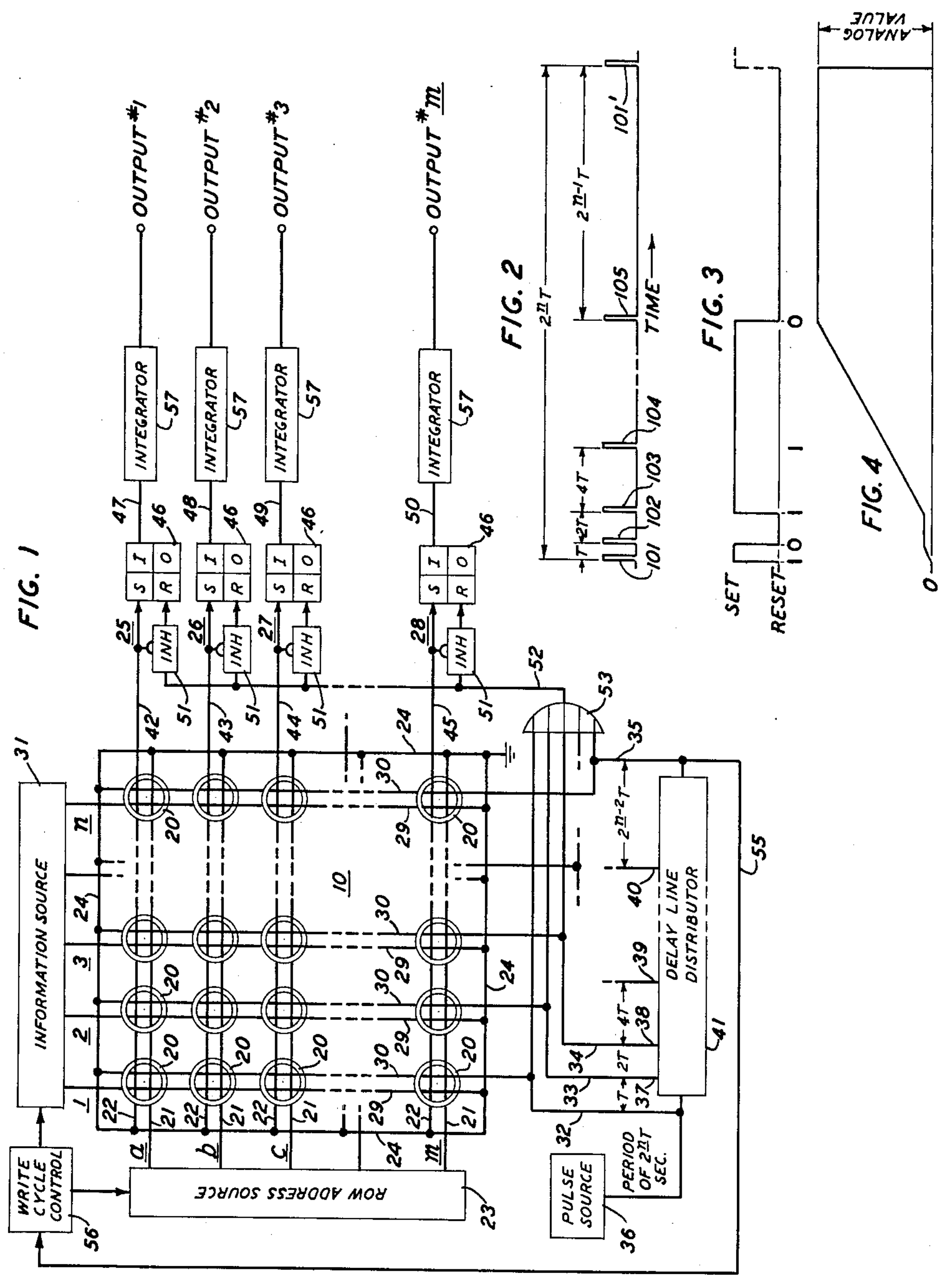

This invention relates to digital-to-analog decoding and, more particularly, to the translation of binary coded data into equivalent time functions.

It has been proposed to convert a binary number into a time interval having a duration proportional to the magnitude of the binary number by counting, in a binary counter, the output from a standard pulse source. The time interval required for the counter to reach a particular binary number is then an analog representation of the magnitude of that binary number. A switch may be arranged to remain closed and thus to energize a load for this interval. Such signals are useful for controlling servo motors in digital control systems. The time interval may be converted to a signal whose amplitude is the analog equivalent of the binary number by a simple integrator circuit which integrates a constant current over the time interval.

The major disadvantage of the counter type of decoding arrangement described above is the complexity and attendant cost and unreliability of the counter circuits. Furthermore, this counting circuitry must be duplicated for each variable which must be simultaneously decoded. In large digital control systems, involving many variables, the cost of counting type decoding apparatus may well be prohibitive.

It is an object of the present invention to reduce the cost and complexity of digital-to-analog converts of the time interval type.

It is another object of the invention to increase the number of variables which may be simultaneously decoded in a digital control system without a sacrifice of speed or accuracy.

It is a more specific object of the invention to convert digital numbers into equivalent analog time functions by means of simple and reliable decoding apparatus.

These and other objects are attained in accordance with the invention by storing the binary number in a row of bit storage devices, such as square loop magnetic cores, and by serially interrogating the storage devices by reading pulses spaced in time by intervals proportional to the weighted analog value of the digit positions being read out. A two-state device, such as a bistable multivibrator, is turned "on" each time a "1" is read out and is turned "off" each time a "0" is read out. The total time the two-state device is in an "on" condition is then proportional to the binary number.

It can be seen that the only apparatus required for this decoding process are elementary storage devices and a timing source for the interrogation pulses. This apparatus may take a very simple form, reducing the cost of both installation and maintenance.

In systems involving a large number of variables, the decoding scheme of the present invention lends itself well to a matrix configuration by means of which all of the variables may be decoded simultaneously. Numbers representing the different variables are written into different rows of storage devices and the same interrogation pulse is applied to the corresponding digit positions of each row. In this way the amount of equipment needed per variable is greatly reduced.

These and other objects and features, the nature of the present invention and its various advantages, may be more fully understood by a consideration of the attached drawings and of the following detailed description of the drawings.

In the drawings:

FIG. 1 is a circuit diagram of a magnetic core matrix decoder in accordance with the principles of the invention; and FIGS. 2 through 4 are graphical representations of waveforms helpful in describing the operation of the circuit in FIG. 1.

The principles of the present invention are equally applicable to any form of binary control or communication system. Furthermore, the invention may be practiced with a large number of different storage and control elements. For convenience, however, the principles of the invention will be explained with reference to a magnetic core storage matrix and a delay line pulse distributor. It is to be understood, however, that these components are merely illustrative and should in no way be taken as limiting.

Proceeding then to FIG. 1 of the drawing, there is shown a storage matrix 10 comprising a plurality of magnetic cores 20 each having a substantially rectangular hysteresis characteristic. Such magnetic cores are capable of remaining in either one or two states of remanent magnetization and of being switched from one of these states to the other by the application of a suitably directed magnetomotive force. These properties are common to certain ferrite materials and will not be further described here.

The magnetic cores 20 of matrix 10 are arranged in rows designated *a*, *b*, *c*, . . . *m*, and in columns designated 1, 2, 3, . . . *n*, to form a two-dimensional matrix in which each core may be uniquely located by the numbers assigned to the row and column in which it appears. Each of the cores 20 has four conductors inductively coupled thereto. These conductors may be coupled advantageously by threading the conductors through the centers of the cores in the manner illustrated. Thus each row of cores *a* through *m* has threaded therethrough a writing conductor 21 and a detecting conductor 22. Writing conductors 21 extend from an address source 23 through the rows of cores to a ground bus 24. Similarly, detecting conductors 22 extend from output circuits 25 through 28 to ground bus 24.

Each column of cores 1 through *n* has threaded therethrough a writing conductor 29 and an interrogating conductor 30. Thus writing conductors 29 extend from an information source 31 through the columns of cores to ground bus 24 and interrogation conductors 30 extend from interrogation pulse conductors 32 through 35 through the columns of cores to ground bus 24.

The writing conductors 21 and 29 are used to write digital information into storage matrix 10 by means of coincident current techniques. That is, each of conductors 21 supplies only one-half of the current required to switch the cores. The other half of the required current is supplied by way of write conductors 29. A binary "1" may then be written into any core of matrix 10 simply by simultaneously energizing conductor 21 in the proper row and conductor 29 in the proper column. The simultaneous appearance of these two currents at the coordinately located core is sufficient to "set" the core in one of its two possible states of remanent magnetization.

Interrogating conductors 30 are threaded through cores 20 in such a manner that a current pulse on each conductor 30 exerts a magnetomotive force on the cores in the corresponding column sufficient to "reset" the cores in that column back to the original state of remanent magnetization. When any one of the cores is thus reset, the change in flux induces a voltage in the corresponding detecting conductor 22, causing an output to appear on that detecting conductor.

It can be seen that the above-described arrangements permit the writing of binary information in the cores of matrix 10 on a row-by-row basis and permit the interrogation of these cores on a column-by-column basis. The purpose of these arrangements will be described hereinafter. It is apparent, however, that any other type of binary storage matrix, utilizing any of the many binary storage elements, may also be used.

In a digital control system, it is often necessary to decode a large number of variables each of which is instantaneously represented by the magnitude of a binary number. In the decoding system of the present invention, information source 31 represents the source of these binary numbers. The binary numbers or codes are given by the permutations in the digits of the code. With an $n$ digit binary code, for example, it is possible to represent $2^n$ different values of a variable. Source 31 therefore provides $n$ output conductors which comprise write conductors 29. On these conductors there appear, simultaneously and in parallel, current pulses corresponding to the permutation of the binary code. Source 31 is capable of successively supplying binary numbers in this form which are representative of the values of a large number of variables. Source 31 may comprise, for example, a magnetic core shift register which forms the output stage of a large computer.

Address source 23 is provided with $m$ output conductors. Source 23 is capable of supplying a current pulse to any one of these $m$ output conductors, but to only one at a time. Each of these output conductors is associated with one of the variables of the digital control system. Sources 23 and 31 are so controlled that each time source 31 supplies a binary number indicating the magnitude of a variable, source 23 supplies a pulse on the output lead associated with that variable. Thus rows $a$ through $m$ of matrix 10 represent the addresses of $n$ digit binary codes, each row storing one such code. By simultaneously supplying an address pulse from source 23 to the $a$ row and a binary code from source 31 to the 1 through $n$ columns, the binary code is written into the $a$ row. Similarly, another code may be written into the $b$ row and so forth. Indeed, a code representative of each of the variables of the system may be written into a unique one of the rows in matrix 10 by the action of address source 23.

Assuming that sources 23 and 31 have functioned to write binary codes representing $m$ variables in the $m$ rows of matrix 10, the description of the operation of the present invention will now be given.

It will be remembered that numbers in the conventional binary code can be represented by $$N=2^0a_0+2^1a_1+2^2a_2+\ .\ .\ .\ +2^na_n$$

where N is the magnitude of the number, $a_0$, $a_1$, $a_2$ . . . $a_n$ are the successive digits of the binary number beginning with the least significant digit and proceeding to the most significant digit, and the various powers of two represent the prescribed weighted values which are attached to the various digit positions. For the present discussion, it will be assumed that the binary numbers to be decoded are in the conventional code and that the digit positions have the above prescribed relative weighted values. It is to be understood, however, that the present invention is in no way limited to the conventional binary code nor to these prescribed weighted values. Other binary codes, utilizing other weighting systems, would be equally suitable.

In accordance with the present invention, the various columns 1 through $n$ of matrix 10 are successively interrogated to determine the binary information stored in each core. To this end, a pulse source 36 delivers pulses having a period between pulses of $2^n$T seconds to a delay line distributor 41. Delay line 41 has a plurality of taps

37, 38, 39, . . . 40 connected to interrogating conductors 32, 33, 34, . . . 35, respectively. The taps are arranged on delay line 41 such that the time delay introduced into a pulse traveling between the input and the first tap 37 is equal to T seconds. The time delay between the first tap 37 and the second tap 38 is 2T seconds, the delay between the second and third taps is 4T seconds, and so forth, the delay increasing geometrically from tap to tap. The delay between the last tap and the end of delay line 41 is equal to $2^{n-2}$T seconds. Delay line 41 therefore has $(n-2)$ taps, the delay between successive taps increasing by a factor of two as each tap is passed. The time positions of the pulses at the various taps can be better seen in FIG. 2.

In FIG. 2 there is shown a graphical representation of the pulses at the various taps of delay line 41. The output of pulse source 36 is applied directly to conductor 32 to interrogate the cores of column 1 in matrix 10. One such pulse is shown at 101 in FIG. 2. T seconds later, this same pulse appears at tap 37 of line 41 and is shown as pulse 102 in FIG. 2. This pulse is applied to conductor 33 and interrogates the cores of column 2 in matrix 10. After 2T seconds the pulse 103 appears at tap 38 and is applied by way of conductor 34 to interrogate the cores of column 3 of matrix 10.

In the manner described above, successive taps on delay line 41 are connected to successive interrogating conductors 30 to interrogate the cores in the corresponding columns. If the least significant digits of the binary numbers from source 31 are stored in the cores of column 1 of maxtrix 10, and the most significant digits in column $n$, it can be seen that the period following each interrogation and before the next interrogation is proportional to the prescribed weighted value of the digit position read out by the interrogation just completed.

Digits stored in the last column $n$ are read out when the pulse leaves delay line 41. This pulse is shown at 105 in FIG. 2. The next pulse generated by source 36 is pulse 101' which follows pulse 105 by a period $2^{n-1}$T. Hence the period following the reading of the last but most significant digit is also proportional to the prescribed weighted value of this digit position.

It is clear that the order of the interrogation pulses may be reversed or otherwise modified simply by suitably arranging the taps on delay line 41. That is, the delay between the input to delay line 41 and tap 37 may be proportional to the prescribed weight of the most significant digit position and successive delays decrease by a factor of two. In this case, the most significant digits of the binary codes would be written into column 1 of matrix 10 and the least significant digit in column $n$. For reasons hereafter to be given in the preferred embodiment the delays are arranged as shown in FIG. 1. Other binary codes could be accommodated, however, with other suitable arrangements.

It will also be noted that the interrogation pulses may be just as readily derived by means of a conventional binary counter having $n$ stages. Such a counter, when supplied with pulses at a rate of $1/T$ pulses per second, will produce the necessary weighted time intervals on the outputs of the successive stages.

Upon being interrogated by a pulse on one of conductors 30, cores 20 in the interrogated column produce output pulses on conductors 22 or fail to produce such pulses as an indication of whether or not a binary "1" was previously stored in the cores of that column. The output pulses are applied by way of output leads 42, 43, 44, . . . 45 to output circuits 25, 26, 27, . . . 28, respectively. Each of output circuits 25 through 28 comprises a bistable device 46 capable of remaining in either one of two stable states. These states are represented schematically by the "0" and "1" appearing on box 46. Each device 46 is capable of being set to the "1" state by the application of a pulse to the "S" input lead and is capable of being reset to the "0" state by the application of a pulse to the "R" input lead. When set by a pulse on the "S" input lead, devices 46 produce outputs on their "1" output leads. When reset by a pulse on the "R" input lead, this output is removed from the "1" output lead. Devices having these properties are well known and will therefore not be further described here. Devices 46 may each comprise, for example, a bistable multivibrator.

Output leads 42 through 45 are connected to the set inputs of devices 46 in output circuits 25 through 28, respectively. Hence an output pulse on lead 42 will set device 46 in circuit 25 to the "1" condition and produce an output on lead 47. Similarly, a pulses on lead 43 will set device 46 in circuit 26 and produce an output on lead 48, a pulse on lead 44 will produce an output on lead 49 by way of circuit 27, and a pulse on lead 45 will produce an output on lead 50 by way of circuit 28.

Each of output circuits 25 through 28 also includes an inhibitor circuit 51 which will pass a signal therethrough only in the absence of a pulse on the lead terminated in a semicircle. These leads, called inhibiting leads, are each connected to the corresponding one of output leads 42 through 45. In the absence of a pulse on the inhibiting lead, each of inhibitor circuits 51 serves to pass a pulse from lead 52 to the reset input "R" of the corresponding bistable device 46. Such so-called "inhibiting gates" are well known and will not be ascribed further.

The output leads 32 through 35 from delay line 41 are all introduced into an "OR" gate 53 which produces a pulse on lead 52 if a pulse appears on any one of input leads 32 through 35. The pulses on lead 52 therefore appear as the train shown in FIG. 2. These pulses serve to reset bistable devices 46 in the absence of pulses on output leads 42 through 45 in the manner described above.

Assuming now that binary numbers representative of the value of *m* variables have been stored in matrix 10, interrogating pulses from source 36 can begin reading the digits of these stored numbers from matrix 10. Considering only a single row, row *a*, it can be seen that the first column is interrogated by the output of source 36 by way of lead 32. If a "1" has been stored in core 20 of column 1, row *a*, a pulse appears on output conductor 42. This pulse sets the bistable device 46 in output circuit 25. If a "0" has been stored in cores 20 of column 1, row *a*, no pulse is delivered to output circuit 25. A pulse is delivered, however, by way of lead 32, OR gate 53 and lead 52 to reset bistable device 46 in output circuit 25. Since no output pulse is delivered from row *a* of matrix 10 if a "0" has been stored, circuit 51 is not inhibited and the reset pulse is freely passed. In the columns where a "1" has been stored, the resulting output pulse serves to inhibit circuit 51 and prevent resetting. In this case, of course, device 46 is set by the output pulse. Each of the other output circuits connected to the other rows function in the same manner.

It can be seen that device 46 is set to one stable state for each "1" output and is reset to the other stable state, if not already there, for each "0" output. Furthermore, the period for which device 46 remains set or reset is proportional to the prescribed weighted value of the digit position read out. Since an entire cycle takes $2^n$T seconds, the portion of this period for which device 46 is in its set condition is proportional to the magnitude of the binary number stored in that row of matrix 10. Indeed, each one of devices 46 serves to represent the value of the binary number stored in the connected row by the ratio of its On time to the total period of the cycle. It is therefore possible to simultaneously translate *m* binary numbers to equivalent time intervals by means of the circuit of FIG. 1. Due to the matrix form of the storage elements and the common use of interrogating pulses, the amount of equipment required per variable is very low. Suitable current amplifiers may, of course, be included in each of the writing, interrogating and reading conductors to provide the current necessary for this simultaneous operation.

In further accord with the present invention, means are provided for writing new information into matrix 10 during the read-out cycle. It is apparent from FIG. 2 that the time between pulse 105 and pulse 101' is available for this purpose. Pulse 105 serves to read out the last column, column *n*, from matrix 10 and therefore has completed the read-out of all of the digits in the stored numbers. Bistable devices 46 must, however, remain in the status determined by these last digits for a period of time proportional to the weighted value of these digits, that is, $2^{n-1}$T seconds. During this period, an entire new set of binary numbers may be written into matrix 10.

To this end, the output pulse from delay line 41, appearing as pulse 105 in FIG. 2, is applied by way of lead 55 to write cycle control circuit 56. Circuit 56 serves to coordinate and enable information source 31 and address source 23 so as to write in a new set of values for the *m* variables. One-half of the entire read-out cycle ($2^{n-1}$T seconds) is available for this process. This affords ample time to write in the necessary *m* variables. On the arrival of the next pulse (pulse 101' in FIG. 2) from source 36, a new read-out cycle can therefore begin immediately following the previous cycle. In this way, no time whatsoever is taken from the output continuity for recording or other operations.

An example of the output waveform from one of devices 46 is shown in FIG. 3. Assuming that the binary number "10110" has been written into row *a* of matrix 10, the interrogation pulses shown in FIG. 2 are successively applied to the cores 20 of row *a*. Each "1" sets bistable device 46 and each "0" resets this device. The resulting output on lead 47 is shown in FIG. 3.

The outputs from bistable devices 46 are suitable for many applications directly and may therefore be applied directly to a suitable load. In a digital control system, for example, this waveform could be applied to a servo motor which would, in effect, integrate the On time of the bistable device 46. For other applications, the outputs of devices 46 may be applied to integrating circuits 57 which electrically integrate this waveform. This may be accomplished in a simple fashion, for example, by gating a constant current into a capacitor for the On portions of the cycle. The total accumulated charge at the end of the cycle would then be proportional to the value of the binary number, that is, the decoded analog value. This integrated waveform is illustrated in FIG. 4. Other more sophisticated integrating schemes can readily be devised by those skilled in the art.

It is to be understood that the above-described arrangements are merely illustrative of the many other arrangements which would constitute applications of the principles of the invention. By applying these principles, those skilled in the art could easily arrive at such other arrangements without departing from the spirit or the scope of the invention.

What is claimed is:

1. A digital-to-analog converter comprising a matrix of magnetic cores arranged in columns and rows, said cores having substantially rectangular hysteresis characteristics and being capable of switching from one magnetic condition to another, means for writing a binary number in each row of said matrix by selectively controlling the magnetic condition of each of the cores therein in accordance with the bit to be stored, each of the cores of a column containing correspondingly significant bits, means for applying successive interrogation pulses to successive columns of cores to successively interrogate the latter at times which are proportional to the prescribed weight of the binary bits stored therein, a plurality of horizontal sense windings threading respective rows of said matrix, said interrogation pulses serving to produce resultant pulses in said sense windings when the cores threaded thereby are in a predetermined one of said magnetic conditions, a plurality of switching means, means coupling each of said sense windings to a respective one of said switching means for setting each said switching means to a first predetermined state when a resultant pulse is produced in the coupled sense winding in response to an interrogation pulse and means for resetting each said switching means to a second predetermined state when no resultant pulse is produced in response to an interrogation pulse.

2. A digital-to-analog translator which comprises a plurality of two-state devices, means for writing the digits of a binary code into said devices, means for interrogating each of said devices at a time proportional to the analog equivalent of the digit stored therein, bistable switching means capable of remaining in either one of two conditions when switched to that condition, means responsive to the interrogation of said two-state devices for switching said bistable switching means to one condition when a binary one is found in any one of said two-state devices and for switching said bistable switching means to the other condition when a binary zero is found in any one of said two-state devices.

3. The translator according to claim 2 further including integrating means, and means for applying a constant signal condition to said integrating means only when said bistable switching means is in said one condition.

4. A digital-to-analog converter comprising a two-dimensional matrix of bit storage devices arranged in coordinate rows and columns, means for writing a binary number into each row of said matrix such that each column contains correspondingly significant digits of said numbers, means for interrogating each column of said matrix at a time proportional to the weighted value of the digit position of that column, a bistable switching means coupled to each row, each of said bistable switching means being capable of being switched between its two stable states and of remaining in either state until so switched, means for setting said switching means in one stable state each time an interrogated storage device of the coupled row has a binary one stored therein, and means for resetting said switching means in the other stable state each time an interrogated storage device of the coupled row has a binary zero stored therein.

5. A digital-to-analog converter which comprises a plurality of magnetic cores capable of remaining in either one of two conditions of remanent magnetization, means for storing a binary number in said cores by selectively controlling the condition of remanent magnetization of said cores, means for applying a signal to each of said cores at a time proportional to the decimal equivalent of the binary digit stored therein and capable of changing the condition of remanent magnetization of each said core to one of said conditions, switching means, means for enabling said switching means each time a core is changed to said one condition by said signal, and means for disabling said switching means each time the condition of a core is not changed by said signals.

6. The converter according to claim 5 further including means for integrating the total time said switching means remains enabled.

7. Binary decoding means which comprises a two-dimensional matrix of square loop magnetic cores arranged in coordinate rows and columns, a first writing conductor threading the cores of each of said columns, a second writing conductor threading the cores of each of said rows, means for applying to said first writing conductors successive binary codes in the form of permutations of current pulses on said first writing conductors, means for applying to said second writing conductors row address pulses in synchronism with the application of said binary codes thereby to write successive codes into the cores of different rows, an interrogation conductor threading the cores of each of said columns, means for applying an interrogation pulse to each of said interrogation conductors thereby to read the binary digits stored in each said column, successive interrogation pulses being spaced by times proportional to the analog-weighted significance of the binary digit written in the interrogated column, an output conductor threading the cores of each row for receiving the binary digits thus read from each said column in the form of pulses, switching means connected to each of said output conductors, means including said output conductors for enabling said switching means each time a binary one is read from the connected row, and means for disabling said switching means each time a binary zero is read from the connected row.

8. The binary decoding means according to claim 7 further including means connected to each of said switching means for deriving a signal proportional to the total time for which the connected switching means is enabled.

9. The binary decoding means according to claim 7 wherein said interrogation pulse applying means comprises a pulse source, delay means having a plurality of tapping points, means for applying pulses from said source to said delay means, and means connecting said interrogation conductors to said various tapping points.

10. The binary decoding means according to claim 7 further including means for enabling said writing conductors in the interval between the interrogation of the last column and the succeeding interrogation of the first column.

11. Binary decoding means which comprises a source of binary numbers, means for storing said binary numbers, means for ascertaining the digits of each of said stored numbers at times proportional to the analog equivalents of the ascertained digits, and means for deriving a signal proportional to the time elapsing between successively ascertained binary ones and binary zeros.

12. Translating means for information encoded in groups of binary pulses, the pulses of each group each bearing a prescribed weight in accordance with the significance of its order within the group, said apparatus comprising a bistable device normally set in a binary zero representing condition, means for applying the pulses of each of said groups to said bistable device, said last-named means including delay means for delaying the application of each pulse succeeding the first of each group by a time interval proportional to the prescribed weight of the next preceding pulse, said bistable device being set to a binary one representing condition, if in the binary zero representing condition, in response to the application of a binary "1" pulse, and means for applying a reset pulse to said bistable device in response to each applied binary zero pulse, said bistable device being reset to said binary zero representing condition, if in the binary one representing condition, in response to each said resetting pulse.

13. The combination in accordance with claim 12 wherein said information is encoded in the conventional binary code and wherein said delay means comprises means for doubling the time interval between each successive pulse, of each group, applied to said bistable device.

14. The combination in accordance with claim 12 and means for integrating the output of said bistable device.

References Cited in the file of this patent

UNITED STATES PATENTS 2,840,801 Beter ---------------- June 24, 1958

OTHER REFERENCES

An Wang: "High-Speed Number Generator Uses Magnetic Memory Matrices," pages 200–204, Electronics, May 1953.